(No Model.)

C. P. ELIESON.
SEPARATOR FOR BATTERY ELEMENTS.

No. 494,849. Patented Apr. 4, 1893.

WITNESSES:
C. Neveux
C. Sedgwick

INVENTOR
C. P. Elieson
BY
Munn & Co
ATTORNEYS.

UNITED STATES PATENT OFFICE.

CHAIMSONOVITZ P. ELIESON, OF NEW YORK, N. Y., ASSIGNOR OF ONE-HALF TO FRANCIS A. PELLAS, OF OGGEBBIO, ITALY.

SEPARATOR FOR BATTERY ELEMENTS.

SPECIFICATION forming part of Letters Patent No. 494,849, dated April 4, 1893.

Application filed July 9, 1892. Serial No. 439,455. (No model.)

*To all whom it may concern:*

Be it known that I, CHAIMSONOVITZ P. ELIESON, of New York city, in the county and State of New York, have invented a new and Improved Separator for Battery Elements, of which the following is a full, clear, and exact description.

My invention relates to improvements in electric batteries such as have cells for generating electrical differences of potential and current, and in which one or more elements or electrodes are held within or partially within another or other elements or electrodes; and the objects of my invention are to produce a separator by means of which the outer and inner electrodes may be held in fixed relative positions so as to maintain a uniform and constant distance between their opposing surfaces, and second, to construct the separator in such a way that it will serve to strengthen and support the electrodes.

My invention is especially useful in connection with batteries of the class shown in Letters Patent of the United States, No. 469,129, dated February 16, 1892.

To these ends my invention consists in a skeleton frame or box shaped to receive the inner electrode or electrodes and adapted to fit between the inner and outer electrodes.

Reference is to be had to the accompanying drawings, forming a part of this specification, in which similar figures of reference indicate corresponding parts in all the views.

Figure 1:
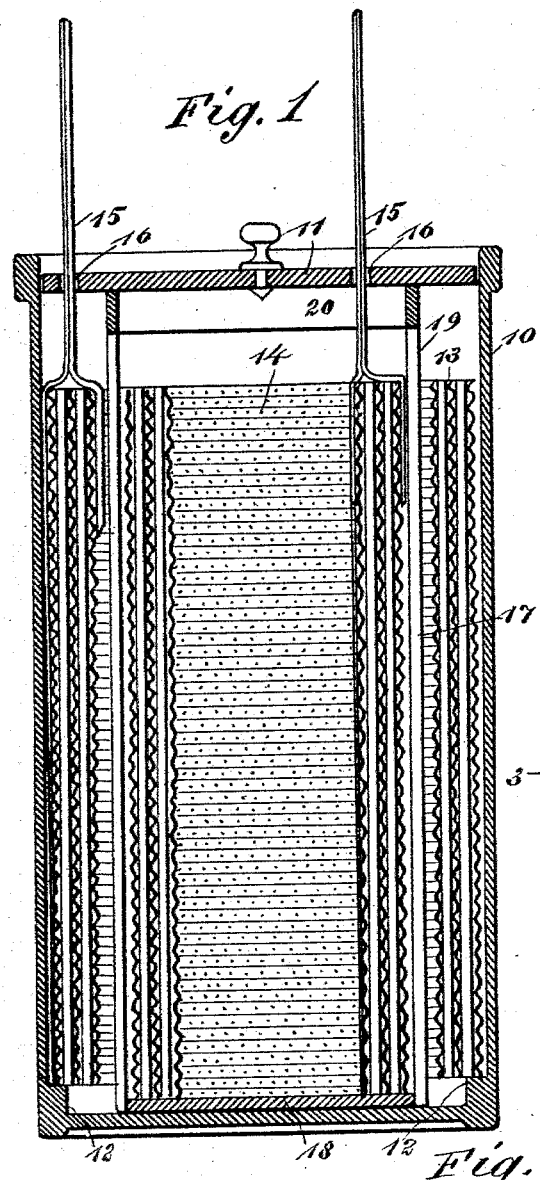
Figure 2:
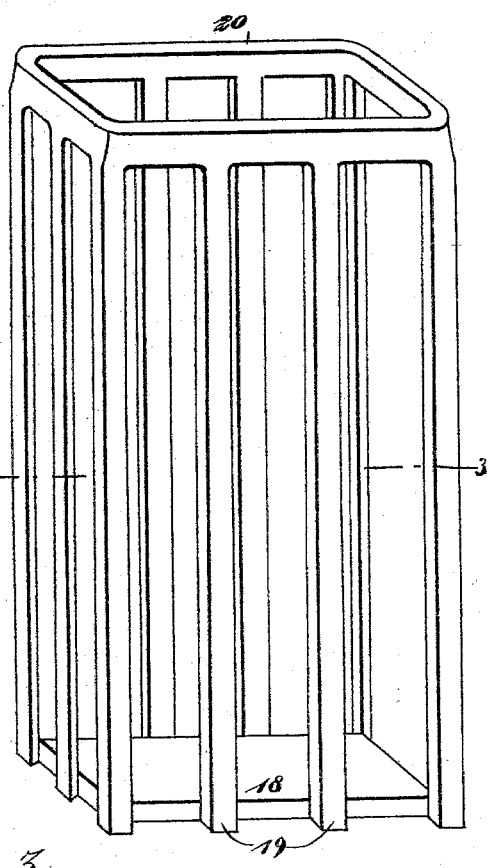
Figure 3:
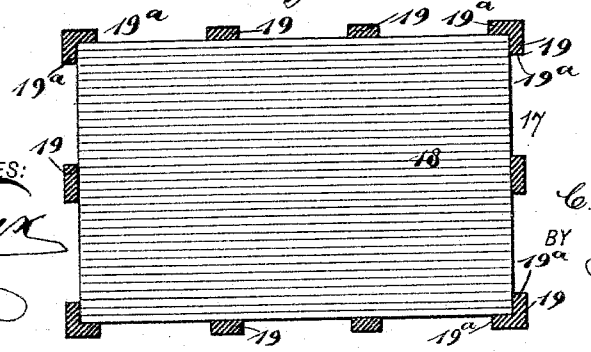

Figure 1 is a central sectional elevation of an electric storage battery or accumulator, having concentric electrodes separated by my improved frame. Fig. 2 is a detail perspective view of the separating frame embodying my invention; and Fig. 3 is a sectional plan on the line 3—3 in Fig. 2.

As shown in Fig. 1, the battery is provided with a suitable case 10, adapted to hold the electrodes and electrolyte, and this case has a removable cover 11, at the top, and an inner circumferential bottom rib 12, adapted to support the outer or negative electrode 13, and leave sufficient space at the bottom of the case for the accumulation of disintegrated material. The inner electrode 14, is concentric with the electrode 13, and both electrodes have flexible ears 15, with which the connections are made, these extending upward through apertures 16 in the cover 11. As shown in the drawings, the electrodes are of the class described in my former patent referred to above, but it will be understood that the frame described below may be applied to other forms of electrodes. The inner electrode 14 is held in an open frame 17, which is shaped so as to hold the electrode tightly and prevent its moving, and the frame is of insulating material so as to properly insulate the two electrodes. It has a solid bottom 18, on which the electrode 14 rests, although the bottom may be slotted or apertured if desired, and parallel vertical side pieces 19, which merge at the top in a ring 20. The corner pieces 19 have side wings 19$^a$, which overlap the corners of the bottom 18 and of the electrode 14, thus giving additional strength to the frame and also preventing any movement of the electrode. The frame fits snugly within the outer electrode 13 and consequently it prevents the movement of said electrode as well as of the inner one 14. It will be noticed that by having the frame a skeleton frame as described, ample space is left for the circulation of the electrolyte of the battery, and the battery constructed with the separator or frame as described is extremely compact and very strong.

Having thus described my invention, I claim as new and desire to secure by Letters Patent—

1. As an improved article of manufacture, a separator for the cells of batteries having outer and inner electrodes comprising a skeleton frame of insulating material open at one end and having slotted sides, the frame being adapted to contain the inner electrode and fit snugly between the two electrodes, substantially as described.

2. As an improved article of manufacture, a separator for the cells of electric batteries having outer and inner electrodes comprising a skeleton frame of the shape approximating that of the electrodes, the frame having an open end, a supporting bottom, and slotted sides to permit the passage of an electrolyte through it, substantially as described.

CHAIMSONOVITZ P. ELIESON.

Witnesses:
WARREN B. HUTCHINSON,
EDGAR TATE.